United States Statutory Invention Registration [19]

[11] Reg. Number: H455

Helton

[43] Published: Apr. 5, 1988

[54] RATE AIDED TRACKING FOR LAUNCH TRANSIENT SURVIVABILITY

[75] Inventor: Monte K. Helton, Madison, Ala.

[73] Assignee: The United States of America as represented by the Secretary of the Army, Washington, D.C.

[21] Appl. No.: 117,161

[22] Filed: Oct. 28, 1987

[51] Int. Cl.[4] ..... F41G 7/22

[52] U.S. Cl. ..... 244/3.15

*Primary Examiner*—Charles T. Jordan

*Attorney, Agent, or Firm*—John C. Garvin, Jr.; Freddie M. Bush

[57] ABSTRACT

Rate aiding tracking prevents or dampens the effect of large scale target motion on a missile borne tracker during transition of a missile from prelaunch tracking to post launch tracking. Rate aided tracking includes a feedback network responsive to existing stable platforms for combining a tracker output signal with a rate signal that is itself responsive to torques present on a stable platform due to target sensor motion. The feedback network includes an integrator and a transformation circuit and is active only during the missile launching phase of operation when transient effects are manifest.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

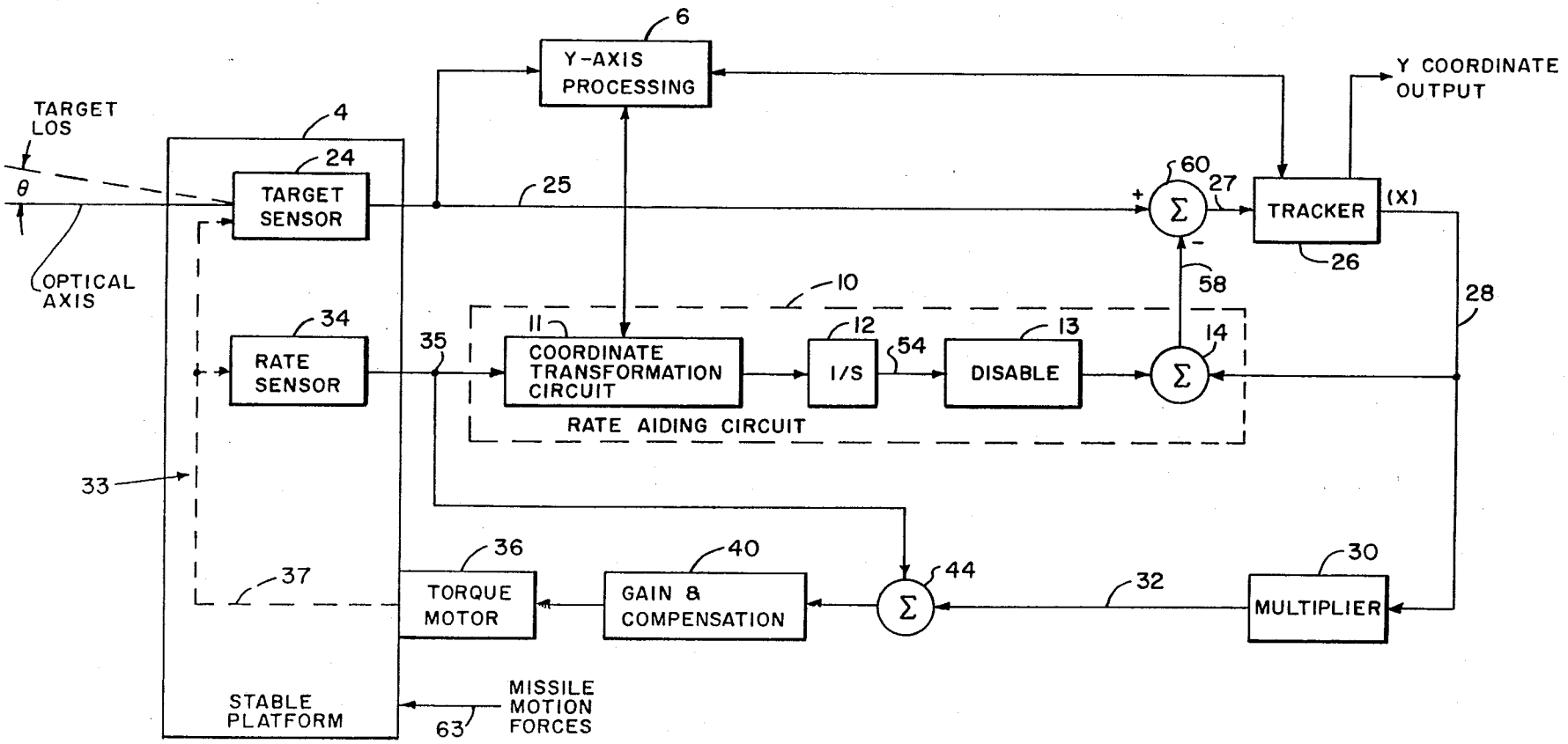
Y COORDINATE OUTPUT
28
(X)
TRACKER
26
MULTIPLIER
30
27
60
58
14
32
13
DISABLE
44
54
12
I/S
10
RATE AIDING CIRCUIT
6
Y-AXIS PROCESSING
COORDINATE TRANSFORMATION CIRCUIT
11
GAIN & COMPENSATION
40
25
MISSILE MOTION FORCES
36
TORQUE MOTOR
63
35
4
24
TARGET SENSOR
34
RATE SENSOR
37
STABLE PLATFORM
33
TARGET LOS
OPTICAL AXIS
θ

RATE AIDED TRACKING FOR LAUNCH TRANSIENT SURVIVABILITY

DEDICATORY CLAUSE

The invention described herein may be manufactured, used, and licensed by or for the Government for governmental purposes without the payment to me of any royalties thereon.

BACKGROUND OF THE INVENTION

Maintaining target track during missile launch transient perturbations is a long standing problem for lock-on-before-launch (LOBL) target tracking seekers. The launch transient must be accomodated by the seeker when the target range is unusually large; consequently, target signal-to-noise (S/N) and apparent target size are at their minimum. Such conditions severely limit the ability of conventional target trackers to follow any large target motion resulting from a launch transient induced sensor rotation. A prior art solution of the launch transient problem has been to increase the performance capability of the sensor stabilization platform to achieve the degree of missile airframe to sensor isolation which limits to an acceptable level the amount of target motion that must be tracked. However, for high performance airframes the degree of stabilization performance required becomes a major cost driver for LOBL seekers.

SUMMARY OF THE INVENTION

For rate aided tracking, pitch and yaw rate information and missile roll rate information are used by the tracker to predict target motion during the launch transient. This auxillary information is used to electrically reposition the target track gate and thereby compensate for any target motion that results from sensor rotation during the launch period. This reduces the work load of the tracker from that of tracking a perceived large target motion to that of tracking the difference between the large motion and an estimate of that motion. This tracking method increases the ability of the target tracker to maintain lock-on during target pertubations induced by undesirable platform motion before launch.

Rate aided tracking is applicable to any LOBL seeker that uses a rate stabilized sensor platform and a tracker with a capability of being electronically re-aimed. The advantage of rate aided tracking is that seeker stabilization performance requirements can be greatly reduced because of the increased capability of the traget tracker. The decrease of the seeker stabilization performance also reduces cost.

BRIEF DESCRIPTION OF THE DRAWING

The single FIGURE is a block diagram of a preferred embodiment of the system for providing platform rate information to the tracker.

DESCRIPTION OF THE PREFERRED EMBODIMENT

Referring now to the drawing, the rate aiding circuitry 10 is shown in dashed lines and is coupled with a standard target tracker 26 and to rate stabilized platform and associated circuitry. A typical rate stabilized platform will involve two degrees of freedom, i.e., it will respond to changes with reference to two coordinate axes normally referred to as x for yaw and y for pitch. It does not respond to changes in the third axis normally referred to as z for roll. The single FIGURE shows a stable platform 4 and related circuitry for providing x and y coordinate axis processing. The y axis processing 6 is shown generally and is identical to the x axis processing discussed in detail.

In a tracking system as shown generally in the single FIGURE, missile motion results in forces being applied to components and systems within the missile housing. Stable platforms such as platform 4 are sensitive to these motions. Thus, when missile motion forces are applied during the transition of a missile from a stationary position within a launcher to unemcumbered flight position free of the launcher, transient forces affect the missile and stable platform therein. These transient forces are manifest in the inertia of the platform, in the gimbal springs, and through friction, to cause a physical or mechanical misalignment of a target sensor 24 from the electro-optically established target LOS and of the rate sensor 34. A torque motor 36 is coupled to the stable platform to respond to forces on the platform to induce a stabilizing influence on the platform. The torque motor can also provide an offsetting or neutralizing response to undersirable motion. In the drawing, these correctional forces are depicted as a mechanical force in dashed lines 33 applied from the torque motor into the target sensor 24 and to rate sensor 34.

In the system target sensor 24, normally composed of an optical telescope system and a detector, converts an impending target scene into an electrical signal 25. The x and y coordinate position of the target within this electrical signal is determined by the angular displacement $\theta$ of the optical axis of the sensor 24 with respect to the inertial line-of-sight (LOS) between the target position and the tracking system reference position or optical axis. The sensor output electrical signal 25 is operated upon by the tracker 26 to extract the target's x coordinate 28. The tracker output 28 is multiplied by a velocity constant in multiplier 30 to produce an output rate command 32 that is coupled back to the stable platform.

Stable platform 4 includes the rate sensor 34, target sensor 24, and torque motor 36. Other circuitry may be on or attached to the platform but are not pertinent to the operation. Missile body motion produces disturbance torque 63 on the stable platform resulting from normal mechanical gimbal spring and friction coupling. Spring and friction coupling is made as small as possible but in a practical system it can never be completely eliminated. Summing circuit 44 receives the output rate command 32 and also receives a feedback signal 35, providing an output which is coupled to the gain and compensation circuitry 40. The gain and compensation circuitry 40 contains standard state of the art components for providing stable closed loop operation of the rate platform control loop. The electrical output of circuit 40 is converted to a mechanical torque 37 by torque motor 36.

The platform 4 responds to the total torque applied to it by moving at a rate determined by the magnitude of the applied torque and the inertia of the platform. However, rate sensor 34 is fixed to the stabilized platform and thus responds to the motion of the platform by generating an electrical output proportional to the platform rate, which provides the feedback input 35 to summing circuit 44. As the stable platform moves at a rate in response to the applied undesirable torque an inertial platform angle is developed and, since the target sensor 24 is fixed to the stable platform, the difference between this platform angle and the target line of sight angle is measured by the target sensor 24. The rate aiding circuitry 10 is shown in dashed lines and comprises a coordinate transformation circuit 11, and integrator 12, and a disable circuit 13 coupled in series with a summing circuit 14. Coordinate transformation circuit 11 also receives the platform rate gyro output 35. In the general case this transformation is the well known Euler Equation and has input angles and rates from all three coordinate axis. In the case shown for only one axis of processing this transformation reduces to unity. The transformation circuit is followed by integrator 12 which integrates the transformer signal to provide output 54 which is an estimate of the platform 4 motion. The integrator 12 is in series with disable circuit 13. During the period of launch disable circuit 13 has a gain of 1. Summing circuit 14 receives the output of the disable circuit 13 and further receives the output 28 from tracker 26. These two signals, combined, are coupled 58 into a summing circuit 60 and combined with the target sensor 24 output for coupling to tracker 26. This combined signal 58 allows the position of the tracker gate with respect to the target sensor field-of-view (FOV) to be shifted in direct proportion to an external electronic command. The electronic command is the output of integrator 12. In this manner the track gate is moved in the same direction as the target motion in the sensor FOV due to sensor rotation. This controlled or directed tracker movement is independent of the ability of the tracker to follow target motion and is used to compensate for missile motion forces during the transient phase of missile launch. However, once the launch is accomplished the gain of disable circuit 13 is reduced to zero in a smooth manner, using a time of approximately 0.5 seconds to go from a gain of 1.0 to zero, eliminating any output as the gain goes to zero. This allows normal control to be reestablished via 34, 35, 32, and 44.

The exact method of moving track gates in response to an external command varies with the particular type of tracker being used. The particular method used to move a track gate is important only for the requirement that the gate motion must be accomplished without interrupting the basic tracking function. For clarity, only a planer (single-axis) rate aided modification is shown. The coordinate data for the other axis must also be provided to the tracker, as shown generally in the drawing. Alternatively, the simple, single axis, rate integration 10 can be replaced by a two or three axis signal integration using the appropriate and well known Euler equations. In addition, the missile roll rate sensor and the platform pitch and yaw rate sensors (not shown) can be used so that roll transients can be accommodated. It should be noted that the success of this additional approach requires an accurate measure by these rate sensors during the period of the launch transient, i.e., the period from ignition or firing of the rocket motor until the missile is free and clear of the launcher. During missile launch severe missile motion and acceleration create the disturbance torques upon platform 4 which act to perturb the normal platform rate and platform position information. In normal operation as a closed loop tracker/rate platform form, the rate platform loop consisting of the rate gyro or rate sensor 34, torque motor 36 and platform gain and compensation 40 offset these perturbations, operating to provide a stable inertial reference on which sensor 24 is mounted.

During platform perturbation, the platform rate gyro (sensor 34) produces output 35 while the rate platform loop (44, 40, 36) responds to any disturbance torques from missile forces (63). The output response 35 is integrated by the electronic integrator 12 to produce the estimate of platform position. The rate is integrated by integrator 12 to provide a platform 4 position which is subtracted geometrically from the detected target LOS angle $\theta$ and results in sensor 24 measuring a target position (output 25) equal to this difference.

Alternatively, for a three dimensional case a set of Euler equations based on missile roll rate as well as platform pitch and yaw rates may be integrated to form the estimated platform position. This estimate can then be input to a summing circuit, which functions as the electronic gate position shifter. The shifting of the track gate position (input 27) is equivalent to a subtraction at summing circuit 60 of the estimated platform position from the sensor measured target position 25. Thus, tracker 26 needs respond only to the target LOS angle $\theta$ plus the difference between the estimated motion of platform 4 (due to launch transient) and the actual motion. The operation of the remainder of the loop is straight forward. The tracker output 28 is multiplied by the seeker velocity constant 30 to produce the platform rate command 32. Command 32 is then input to the rate platform summing junction 44 to close the track loop. After the period of the launch transient, integrator 12 cannot be allowed to remain in the loop and must be discharged to zero at a rate trackable by the tracker 26 as hereinabove noted.

Although the present invention has been described with reference to a preferred embodiment, workers skilled in the art will recognize that changes may be made in the form and detail without departing from the scope and spirit of the foregoing disclosure. Accordingly, the scope of the invention should be limited only by the claims appended hereto.

I claim:

1. In a target tracking system wherein a target sensor on a missile is directed by a tracker to maintain track of a target position by summing the line-of-sight deviation of the target from the reference axis of a stable platform on the missile, the improvement comprising: a rate aiding circuit coupled between the stable platform and the tracker for stabilizing the tracker input signals during the missile launching transition period, said rate aiding circuit having at least first and second inputs and an output for receiving input signals from the stable platform and from the tracker respectively and providing a maximum output signal to the tracker during the launching transition period and a minimum output signal thereafter.

2. In a target tracking system as set forth in claim 1 said rate aiding circuit comprising: an integrator coupled to receive a signal indicative of changes occurring in stable platform position and for providing an integrated signal output, a disable circuit having an input coupled to the integrator output for providing a maximum gain output; and a summing circuit having first and second inputs and an output, said first input being coupled to the output of said disable circuit, said second input being coupled to receive the output from said tracker, and said output being coupled to provide an input to said tracker during missile launch.

* * * * *